Aug. 7, 1934.  H. C. MEON  1,968,844
VARIABLE PITCH PROPELLER
Filed Feb. 21, 1933   11 Sheets-Sheet 3
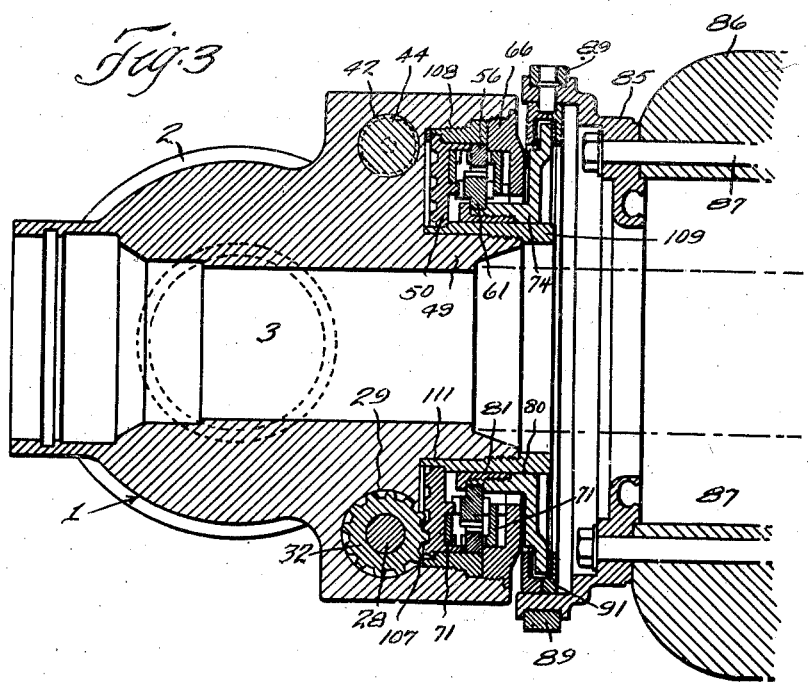
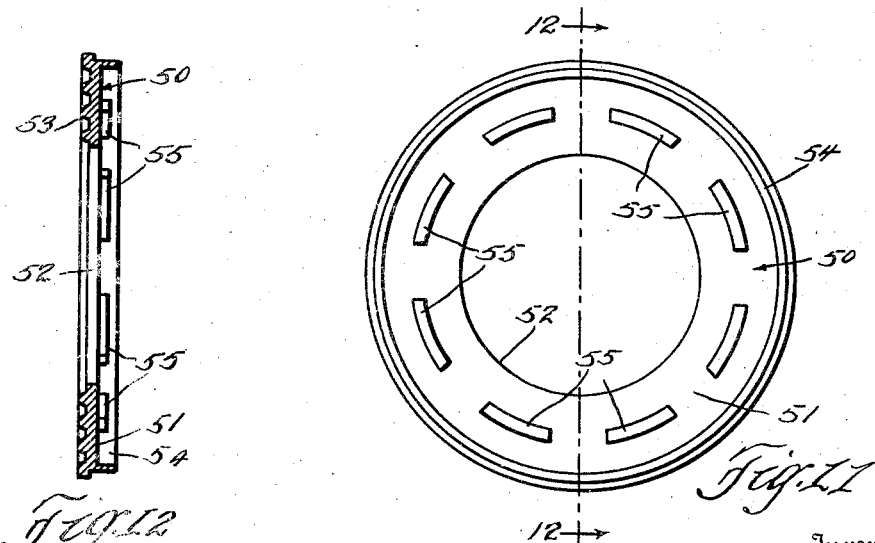

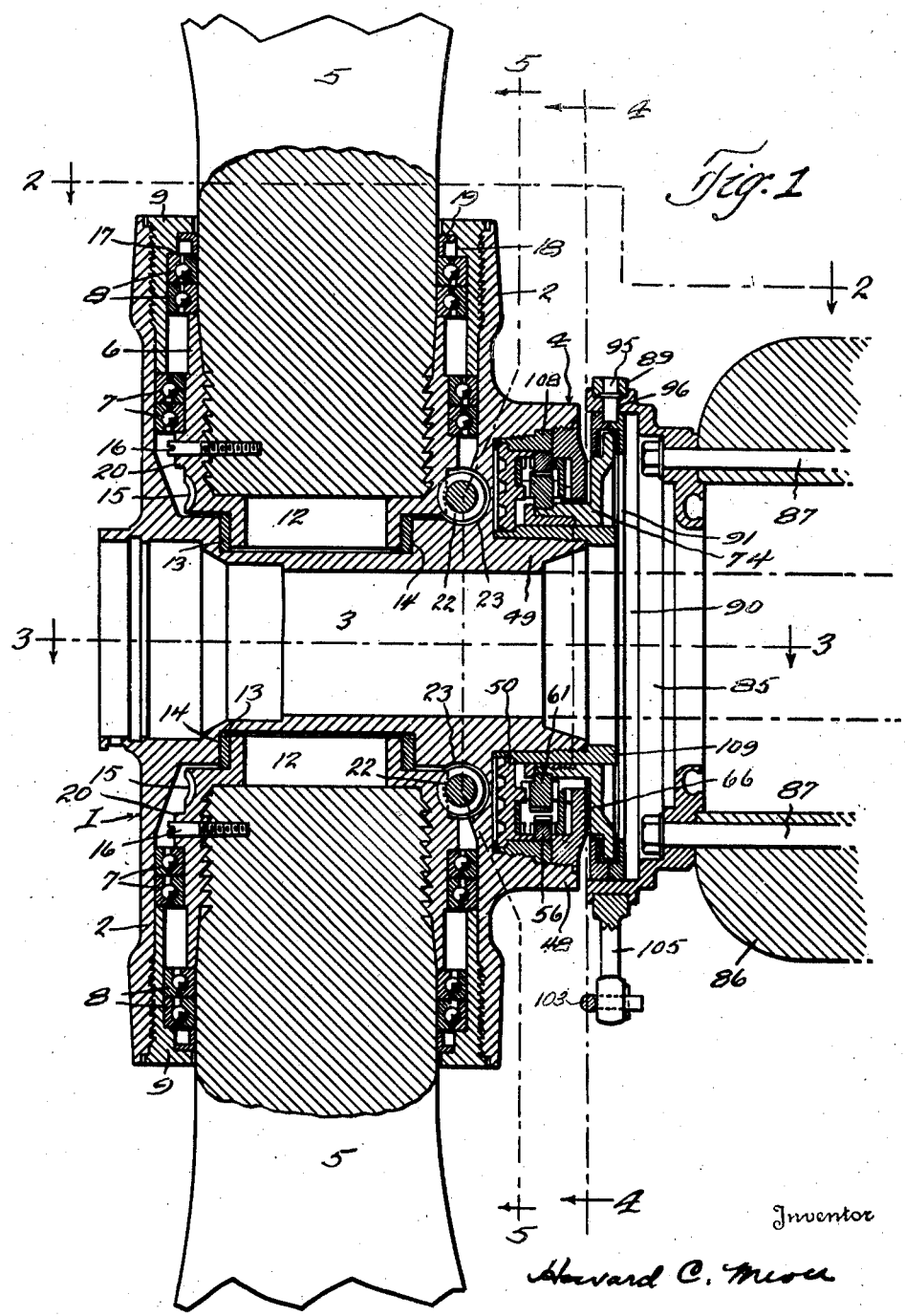

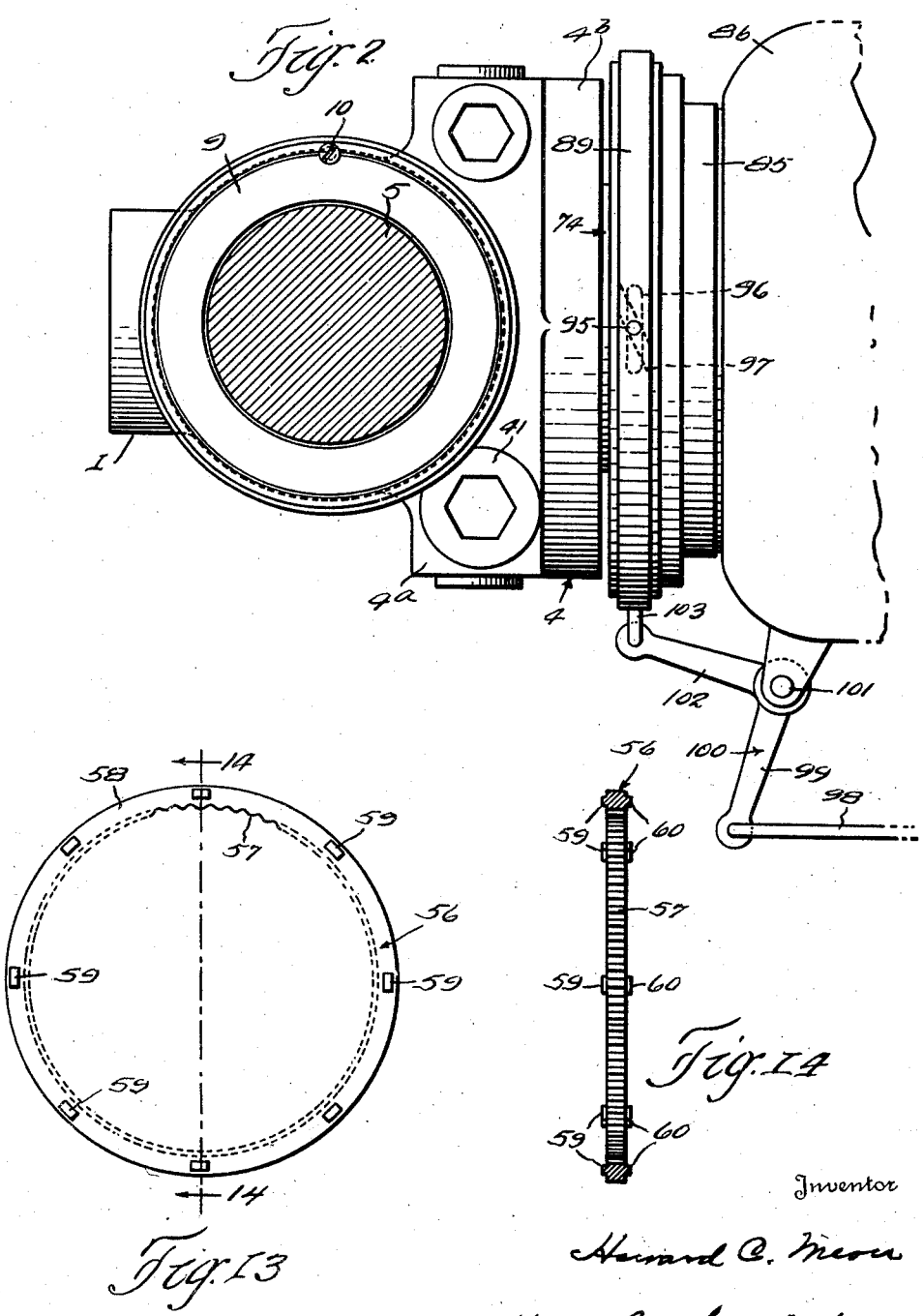

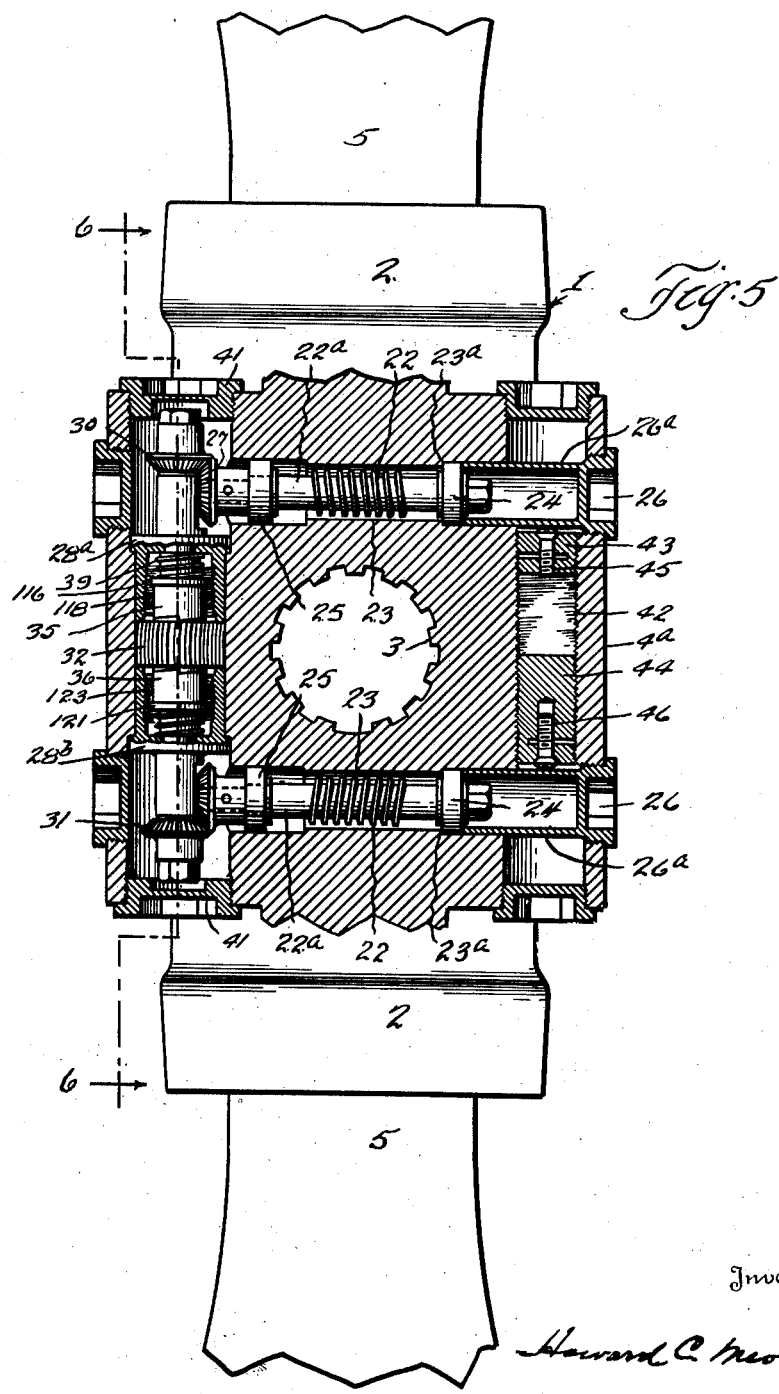

Aug. 7, 1934.  H. C. MEON  1,968,844
VARIABLE PITCH PROPELLER
Filed Feb. 21, 1933  11 Sheets-Sheet 6
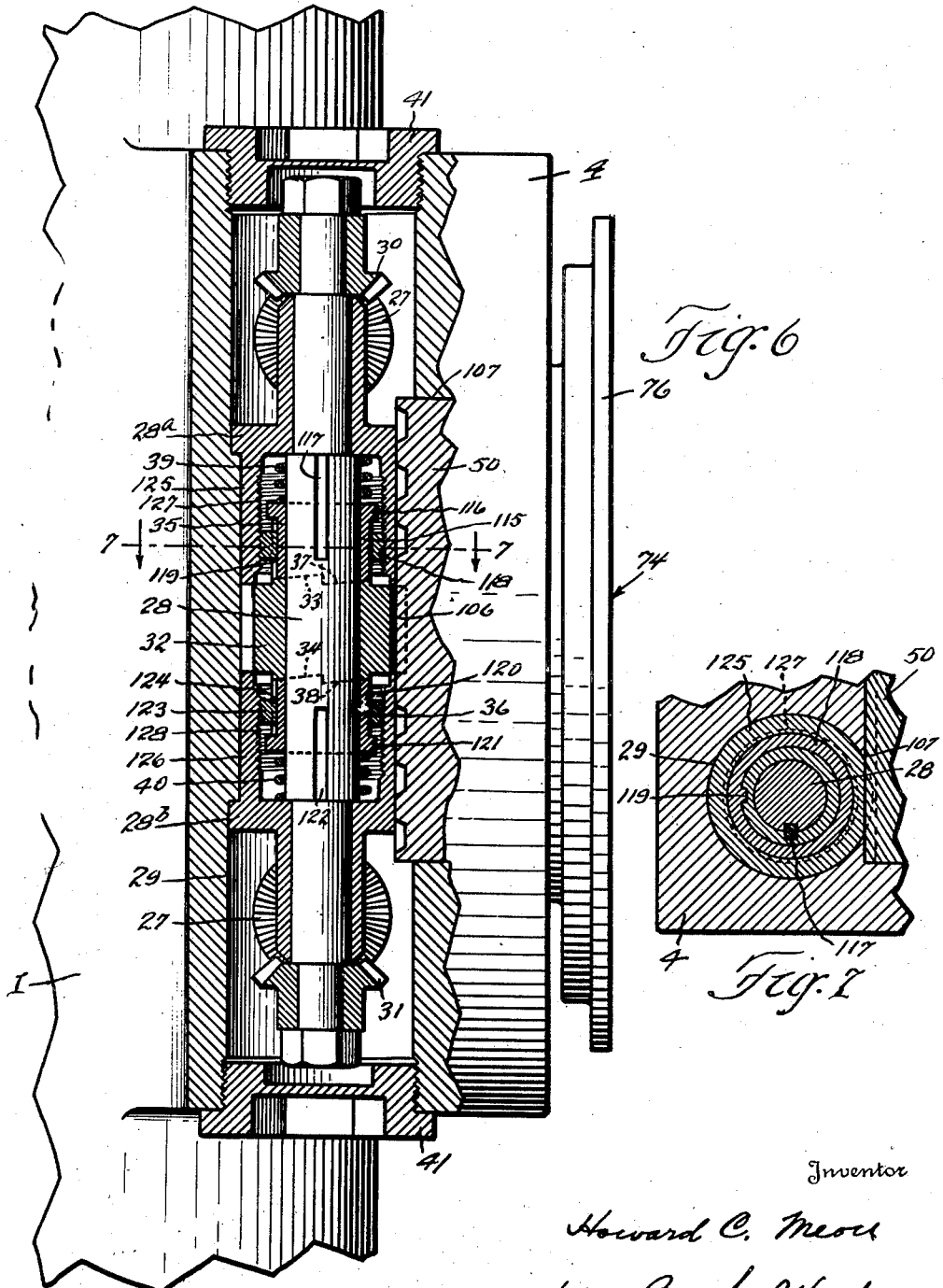

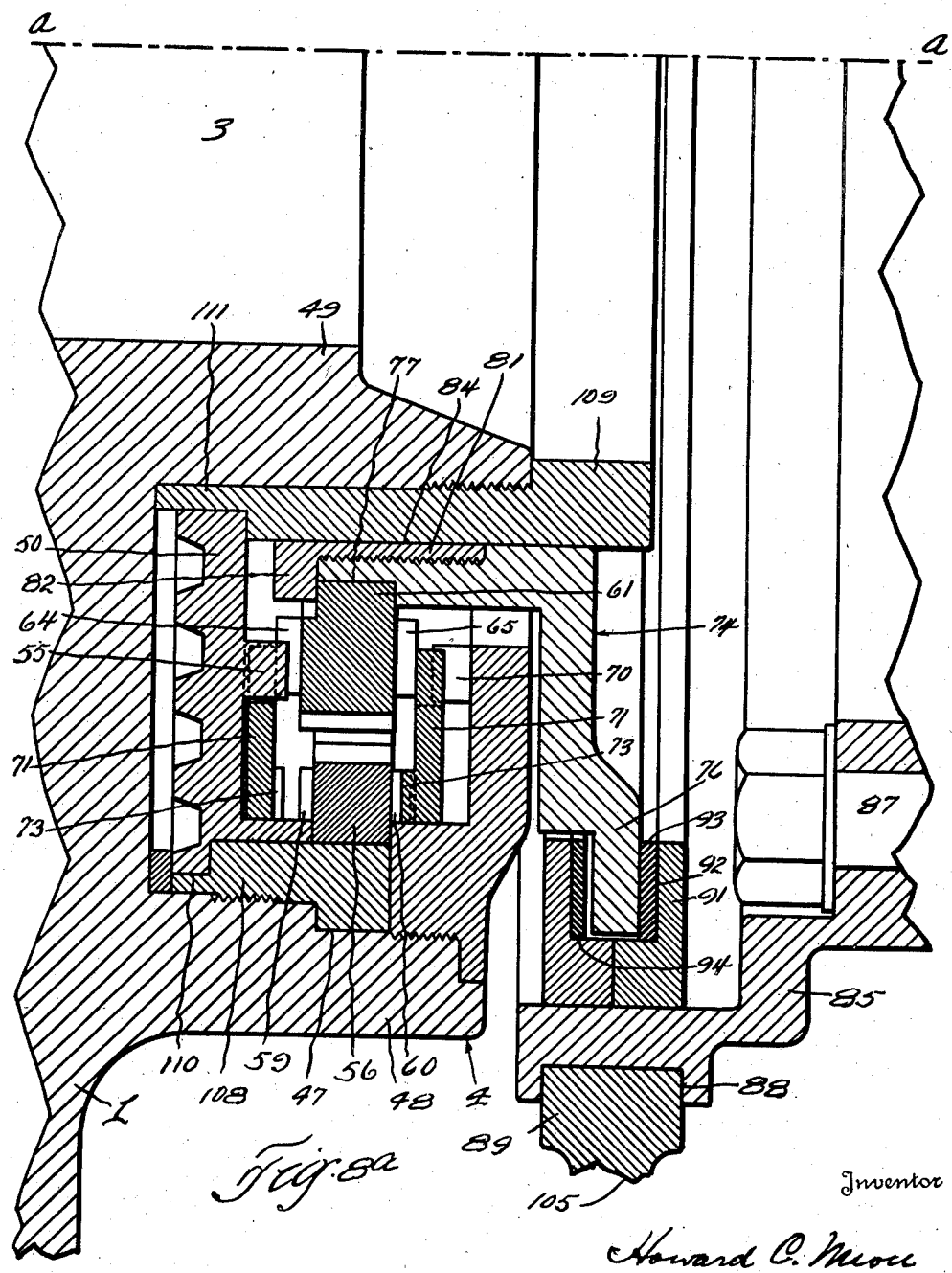

Aug. 7, 1934.                H. C. MEON                1,968,844
                        VARIABLE PITCH PROPELLER
                    Filed Feb. 21, 1933    11 Sheets-Sheet 9
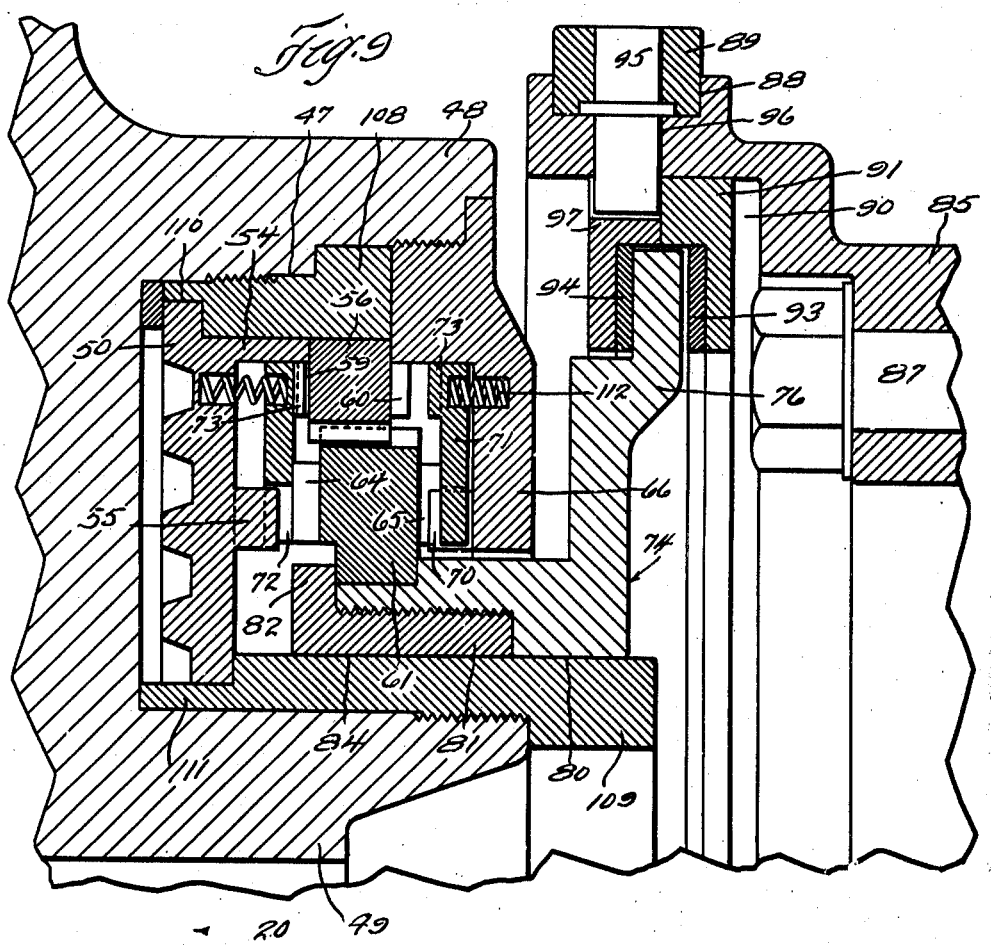
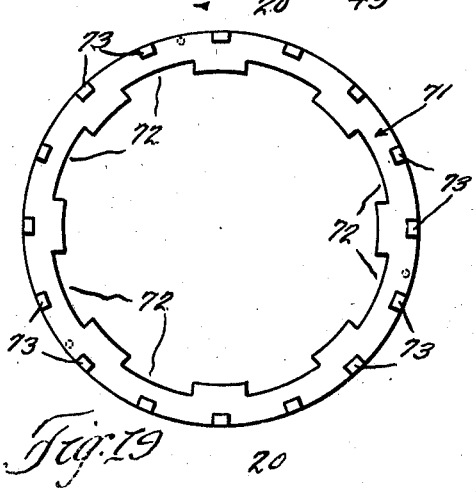
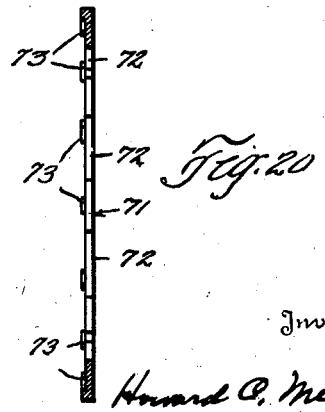
Inventor
Howard C. Meon
By Hull, Brock West
Attorney

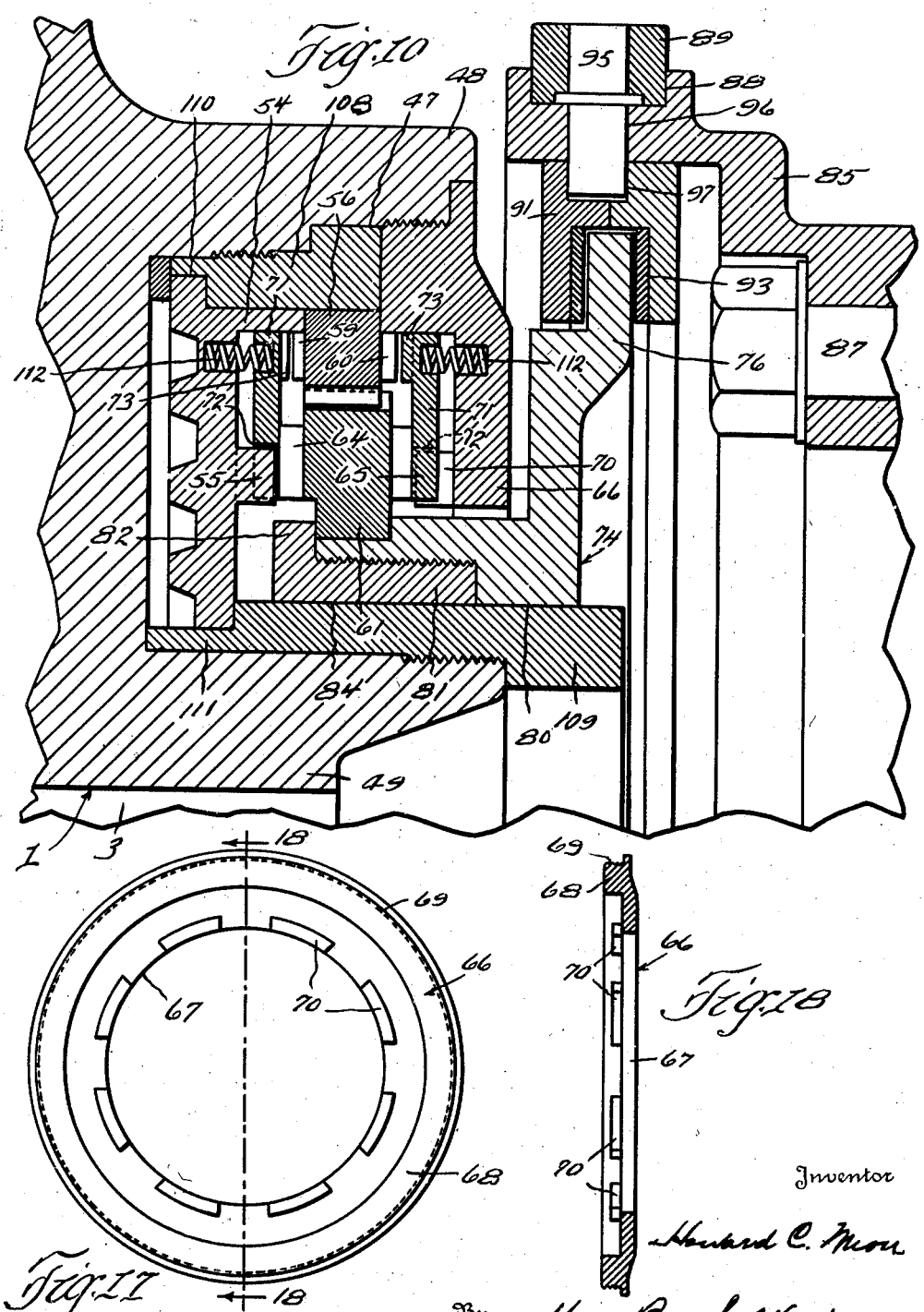

Aug. 7, 1934.  H. C. MEON  1,968,844
VARIABLE PITCH PROPELLER
Filed Feb. 21, 1933   11 Sheets-Sheet 11
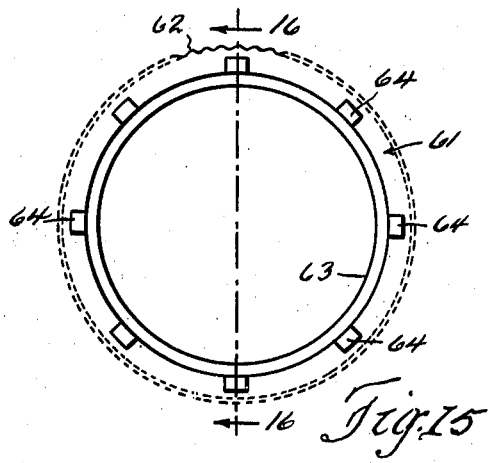
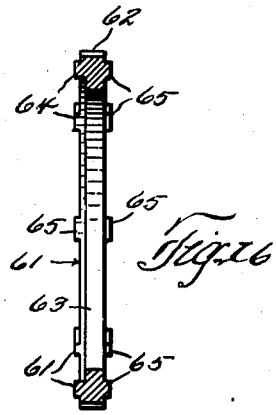
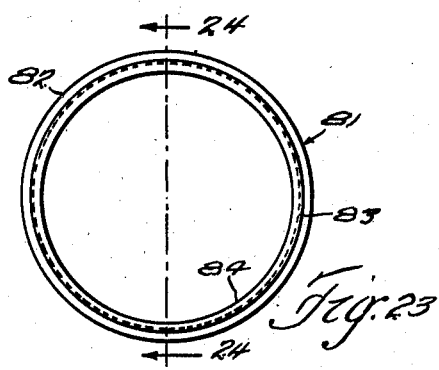
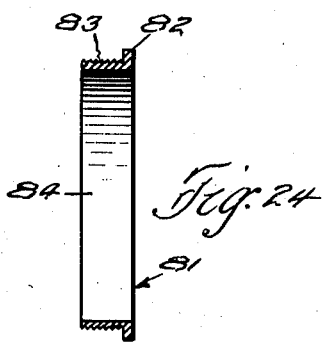
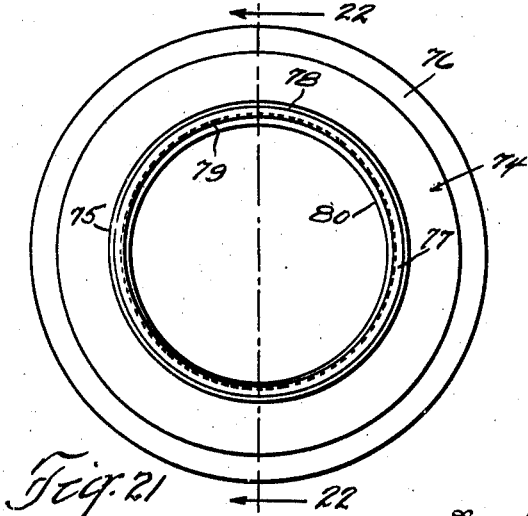
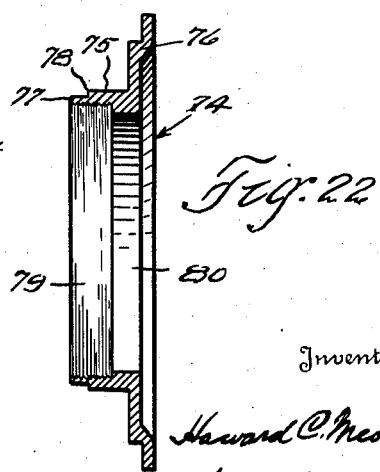

Patented Aug. 7, 1934

1,968,844

UNITED STATES PATENT OFFICE 1,968,844

VARIABLE PITCH PROPELLER

Howard C. Meon, Cleveland, Ohio

Application February 21, 1933, Serial No. 657,751

32 Claims. (Cl. 170—163)

This invention relates to variable pitch propellers for aeroplanes and one of the objects of the invention is to provide simple and effective means operable from the propeller shaft for varying the pitch of the propeller blades which means are normally inoperative and subjected to wear only during the short period required to change the pitch of the blades.

Another object of the invention is to provide an improved hub construction and propeller blade mounting which is provided with means for changing the pitch of the blades, such mechanism including gears which are in constant mesh and which are operated only during the short period of time required to change the pitch of the blades.

A further object of the invention is to provide a mechanically operated variable pitch propeller of the character described in which the friction and consequent wear of the gears is reduced to a minimum and the life of the parts thus greatly prolonged, and in which the speed of the pitch changing mechanism is greatly reduced with respect to the speed of the engine from which the pitch changing mechanism is driven.

A still further object of the invention is to provide an improved hub construction for variable pitch propellers which includes a pair of constantly meshing gears and means for holding one of said gears against rotation with respect to the hub and means for causing rotation of the other of said pair of gears with respect to the hub, said gears being normally at rest with respect to the hub.

Figure 4:
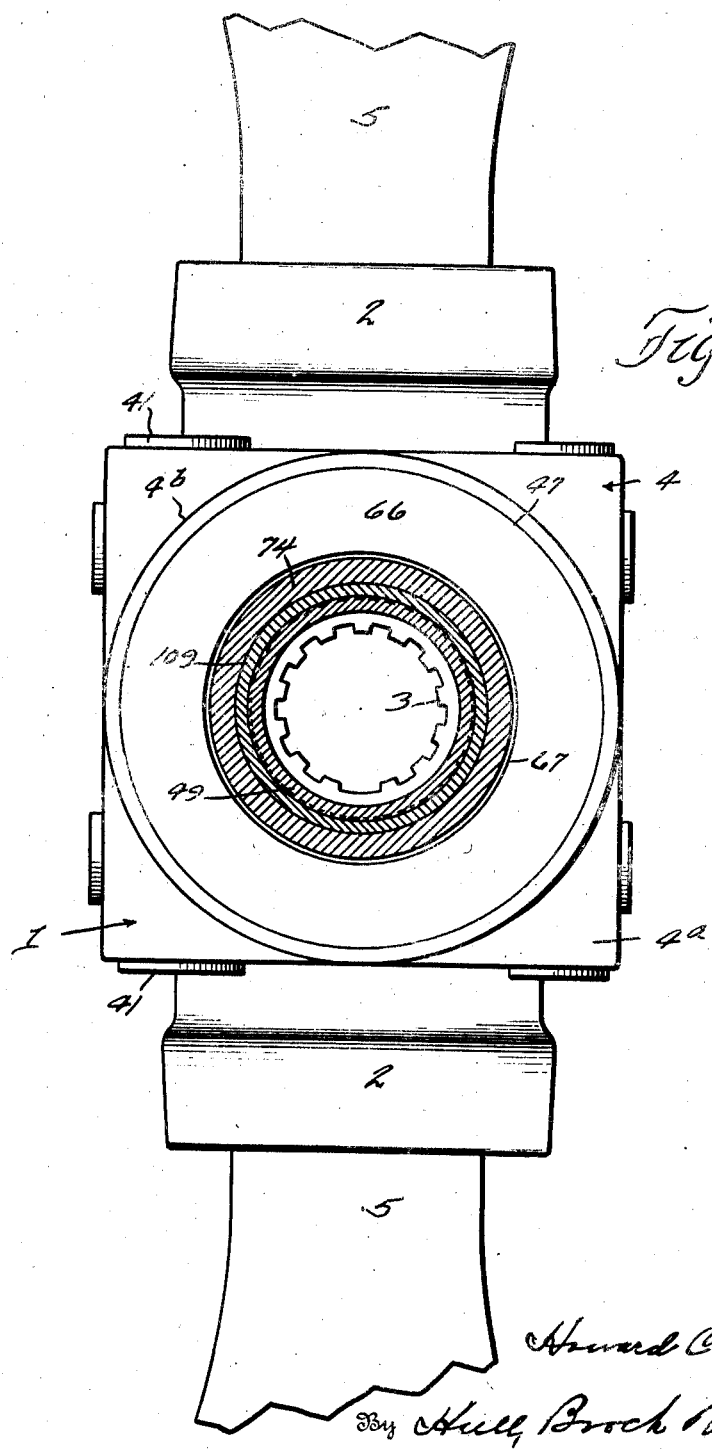
Figure 8:
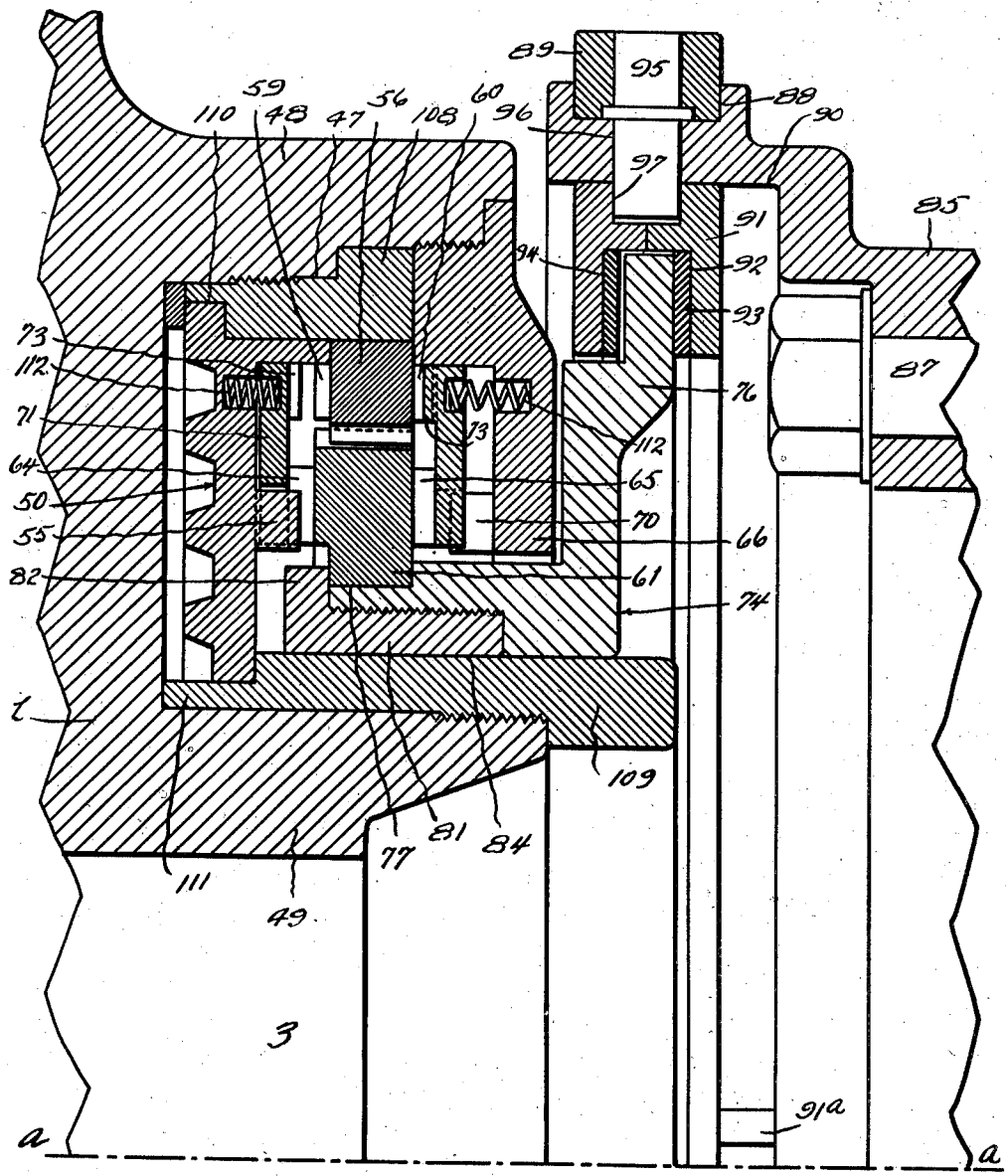

Further and more limited objects of the invention will appear as the description proceeds and by reference to the accompanying drawings in which Fig. 1 is a vertical sectional view through a propeller hub embodying my invention; Fig. 2 is a horizontal sectional view taken on the line 2—2 of Fig. 1; Fig. 3 is a horizontal sectional view taken on the line 3—3 of Fig. 1; Fig. 4 is a vertical sectional view taken on the line 4—4 of Fig. 1; Fig. 5 is a vertical sectional view taken on the line 5—5 of Fig. 1; Fig. 6 is an enlarged vertical section taken on the line 6—6 of Fig. 5; Fig. 7 is a horizontal section taken on the line 7—7 of Fig. 6; Figs. 8 and 8a joined together on the dot and dash line a—a form a greatly enlarged vertical sectional view through the rear end of the hub showing the pitch changing mechanism in a position to rotate the propeller blades in one direction; Fig. 9 is a view similar to Fig. 8 showing the pitch changing mechanism in a position to rotate the propeller blades in the opposite direction; Fig. 10 is a view similar to Figs. 8 and 9 showing the pitch changing mechanism in a neutral position; Fig. 11 is a rear elevation of a spiral gear which may be rotated in either direction to increase or decrease the pitch of the propeller blades; Fig. 12 is a vertical view taken on the line 12—12 of Fig. 11; Fig. 13 is a side elevation of an internally toothed ring gear which is rotatably mounted in the hub and held from axial movement; Fig. 14 is a sectional view taken on the line 14—14 of Fig. 13; Fig. 15 is a side elevation of an externally toothed ring gear which is mounted in the hub for rotary and axial movement and is constantly in mesh with the internally toothed ring gear; Fig. 16 is a sectional view taken on the line 16—16 of Fig. 15; Fig. 17 is a side elevation of a closure ring which screws into the opening in the hub in which the various operating parts are assembled; Fig. 18 is a vertical section taken on the line 18—18 of Fig. 17; Fig. 19 is a side elevation of a clutch ring, one of which is placed on each side of the ring gears and functions to clutch one of these gears to the spiral gear and the other to the closure ring or vice versa; Fig. 20 is a vertical sectional view taken on the line 20—20 of Fig. 19; Fig. 21 is a side elevation of an eccentric ring which is mounted in the hub for rotary and axial movement and on which the spur gear is mounted for rotary movement; Fig. 22 is a vertical sectional view taken on the line 22—22 of Fig. 21; Fig. 23 is a side elevation of a ring which screws into the eccentric ring to retain the spur gear thereon and Fig. 24 is a vertical sectional view taken on the line 24—24 of Fig. 23.

Referring to the accompanying drawings, by numerals, 1 denotes generally a propeller hub having radial sockets 2, in which the propeller blades are mounted, and a central bore 3 in which the drive shaft is fastened. The inner face (that is, the face toward the aeroplane) of the hub is enlarged at 4, this enlarged part 4 containing various bores and compartments in which the various operating mechanisms to be described hereinafter are mounted.

The propeller blades 5 have caps 6 screwed onto their inner ends, and are rotatably secured in the radial sockets 2 by ball bearings 7 and 8 and a ring 9. This ring 9 is screwed into the open end of the sockets 2 and is prevented from unscrewing by any suitable locking device such as a stud 10. The caps 6 have reduced inner cylindrical ends 12, which extend into bearings 13 pressed into reduced sockets 14 in the inner ends of the sockets 2. Gears 15 are formed in the periphery of the caps 6 adjacent their reduced ends 12. Each cap 6 also has formed thereon, adjacent the gear 15, a flange 20. Screw studs 16 prevent the caps 6 from unscrewing from the ends of the blades 5.

The screw rings 9 have circular shoulders 17 on their inner faces near the outer ends thereof, and adjacent to the shoulders 17 circular recesses 18 in which are placed grease retaining leather washers 19.

In assembling the various parts on the blades 5 for securing them in the sockets 2, the rings 9 are first slipped onto the inner ends of the blades, then the washers 19 and the bearings 8 and 7 in the order named. The caps 6 are then screwed on and locked by the studs 16. The blades and parts then assembled thereon are then inserted in the sockets 2, and the rings 9 screwed into the outer ends of the sockets and locked by the studs 10.

By reference to Fig. 1 it will be seen that when the parts are thus assembled the bearings 7 are firmly clamped between the inner ends of the rings 9 and the flanges 20 and that the bearings 8 are clamped between the shoulders 17 and the outer ends of the caps 6. Grease is packed around these various parts as they are assembled.

This construction forms a very efficient and simple way of securely holding the blades 5 in the sockets 2, and at the same time allows them to be very easily rotated in the bearings 7 and 8, by worms 22 which mesh with the gears 15.

These worms 22 are mounted in transverse bores 23 on bearings 24 and 25 and are securely held and positioned therein by closure caps 26 having cylindrical extensions 26ª which clamp the bearings 24 between their ends and shoulders 23ª (Fig. 5). Bevel gears 27 are secured to ends of the worm shaft 22ª adjacent the bearings 25.

A shaft 28 that is mounted in bearing members 28ª and 28ᵇ, presses into a bore 29 extending at right angles to the bores 23 and in the same plane therewith and has bevel gears 30 and 31 rigidly secured to opposite ends thereof. The bevel gear 30 meshes with one of the gears 27 and the gear 31 meshes with the other gear 27. As will be seen by reference to Figs. 5 and 6 the gears 27, 30 and 31 are so positioned that when the shaft 28 is rotated the worms 22 will be rotated in opposite directions.

Loosely mounted on the shaft 28 midway thereof is a gear 32 having oppositely disposed clutch faces 33 and 34. Slidably keyed on the shaft 28 on opposite sides of the gear 32 are clutch members 35 and 36 having clutch faces 37 and 38 which are normally pressed into engagement with the clutch faces 33 and 34 on the gear 32 by springs 39 and 40. When the gear 32 is rotated in one direction it will be clutched to the shaft 28 by the clutching mechanism on one side and when it is rotated in the other direction it will be clutched to the shaft 28 by the clutching mechanism on the other side. Caps 41 close the ends of the bore 29.

Opposite the bore 29, in the same plane therewith and parallel thereto is a bore 42 in which are screwed two counterweights 43 and 44 which may be locked in any desired positions by the lock screws 45 and 46. These weights are used for properly balancing the propeller after all the parts have been assembled.

A ring shaped groove 47 is formed in the face of the enlarged part 4 of the hub. By cutting the groove 47 in the inner face of the enlarged part 4 of the hub an outer cylindrical flange 48 surrounding the groove and an inner tubular extension 49 surrounding the bore 3 are formed. That portion of the enlarged part 4, which contains the bores 23, 29 and 42 is square as indicated at 4ª and that portion which encompasses the groove 47 is round as indicated at 4ᵇ. This is done merely to avoid any unnecessary weight.

The parts illustrated in Figs. 11 to 24 inclusive are assembled in the groove 47 and cooperate with each other to rotate the gears 32, which in turn through the various shafts, gears and worms hereinbefore described cooperate to rotate the blades 5.

Each of the parts illustrated in Figs. 11 to 24 will first be described in detail and then the manner in which they are assembled with each other in the groove 47 will be described.

Figs. 11 and 12 illustrate a spiral gear which meshes with the gear 32 and through which the gear 32 is driven in either direction. This gear, generally denoted by the numeral 50, comprises a disc 51, having a central cylindrical bore 52. Teeth 53 are cut, spirally, in one face thereof, extending outwardly from the bore 52 to the periphery of the disc. A cylindrical flange 54, spaced inwardly a slight distance from the periphery of the disc extends outwardly from the opposite faces of the disc. Eight lugs 55 are also formed on this face and are equally spaced from each other.

An internally toothed ring gear generally denoted by the numeral 56 is detailed in Figs. 13 and 14. This gear is formed by cutting teeth 57 on the inner face of a ring 58, the outer face of the ring 58 being circular and concentric to the teeth 57 and of the same diameter as the outside diameter of the flange 54 on the spiral gear 50. Eight similar lugs 59 are equally spaced around one side of the ring 58 and project outwardly therefrom, and eight similar lugs 60 are equally spaced and project outwardly from the opposite side of the ring 58.

Figs. 15 and 16 show an externally toothed ring gear 61 having teeth 62 cut on the periphery thereof, concentric to an enlarged central bore 63. Eight lugs 64 are equally spaced around one side of the gear and extend outwardly therefrom and eight similar equally spaced lugs 65 extend outwardly from the opposite side of the gear. This gear has fewer teeth than the gear 56 and when assembled in place is always in mesh with the gear 56. In operation the gear 56 is caused to roll around the gear 61 to turn the blades 5 in one direction, and the gear 61 is caused to roll around the gear 56 to turn the blades in the opposite direction. Due to the difference in the number of teeth a great reduction is effected. For instance, if the gear 56 had fifty teeth and the gear 61 had forty-nine teeth one of the gears would have to roll around the other fifty times to rotate it one revolution. Thus a reduction of 50 to 1 would result.

The closure ring for the groove 47 is illustrated in Figs. 17 and 18, and is denoted generally by the numeral 66. This closure ring comprises a disc having an enlarged central bore 67 and an annular flange 68 extending outwardly from one side thereof, the periphery of the flange being threaded as at 69. Eight similar equally spaced lugs 70 project outwardly from the same face as the flange 68. The widths of the lugs 70, and consequently the spaces between them, are the same as the lugs 55 and the spaces between them.

Figs. 19 and 20 show a clutch ring generally denoted by the numeral 71. The outside diameter of this ring is the same as the inside diameter of the flanges 54 and 68. The inner edge of the ring 71 has eight notches 72 cut therein. These notches are the same size and shape as the lugs 55 and 70. Two of these rings are used, one being assembled with the spiral gear 50, the notches 72 fitting around the lugs 55 and the other being assembled with the closure ring 66 the notches 72 fitting around the lugs 70. A plurality of lugs 73 project outwardly from one side of the ring 71.

Figs. 21 and 22 are details of a control member generally denoted by the numeral 74, which comprises a short cylindrical body portion 75 having a flange 76 extending radially at one end, and having its other end reduced as at 77, a shoulder 78 being formed between the periphery of the body portion 75 and the periphery of the reduced portion 77. The peripheries of the portions 75 and 77 are concentric. The member is bored concentrically for about half its depth and threaded as indicated at 79, while the remainder is bored eccentrically as indicated at 80.

A ring 81, detailed in Figs. 23 and 24, which is flanged as at 82 and threaded as indicated at 83 is screwed into the bore 79. This ring 81 has an eccentric bore 84 which is the same diameter as, and aligns with, the bore 80 when it is assembled in the control member 74.

An extension 85 which is bolted to the front of the engine 86 by bolts 87, has an enlarged open end closely adjacent the rear of the hub. This extension 85 has a circular groove 88 formed in its periphery near the open end thereof, in which is rotatably mounted a ring 89.

The extension 85 is bored concentrically to the groove 88 for a short distance rearwardly from the open end thereof as indicated at 90. Slidably keyed at 91ª for axial movement in the bore 90 is a ring 91, made up of two halves bolted together, which has a groove 92 formed in its inner face. The sides of the groove 92 are faced with material, such as brake lining as indicated by the numerals 93 and 94, having a high coefficient of friction.

The ring 89 has fastened thereto a plurality of lugs 95 which extend through straight slots 96 in the extension 85 and enter angularly disposed slots 97 in the periphery of the ring 91. Thus, when the ring 89 is rotated the ring 91 will be moved backwardly or forwardly depending on the direction the ring 89 is rotated. The ring 89 is rotated by moving a rod 98 which has one end connected to one leg 99 of a bell crank 100 pivoted at 101 to the motor. The other leg 102 of the bell crank is connected by a rod 103 to an arm 105 extending outwardly from the ring 89.

In assembling the various parts just described into the groove 47, the spiral gear 50 is first inserted and meshes with the gear 32 as indicated at 106. One side of the bore 29 intersects the groove 47 at 107 (Figs. 3 and 6). A ring 108 is next screwed into the groove 47, and then a collar 109 is screwed onto the tubular extension 49. The outer end of the ring 108 has an annular recess 110, and the outer end of the collar 109 has an annular flange 111 which extends through the bore 52 of the gear 50. The periphery of the gear 50 fits into the recess 110 and the flange 54 extends into the ring 108. In this manner the ring 108 and collar 109 rotatably support and position the gear 50 in the groove 47.

Next, one clutch ring 71 is inserted, the notches 72 in the ring fitting over the lugs 55 on the spiral gear 50. As will be seen in Figs. 8 to 10, the width of the ring 71 is less than the depth of the lugs 55. This clutch ring is mounted for sliding movement within the flange 54, but as seen in Figs. 8 to 10 is never out of engagement with the lugs 55. Consequently the spiral gear 50 will always move with the ring 71.

The internally toothed ring gear 56 is next inserted and is rotatably supported within the ring 108 between the end of the flange 54 and the closure ring 66.

The ring 91 is then assembled about the periphery to the flange 76 of the control member 74. Then the closure ring 66 is slipped over the body portion and the other clutch ring 71 inserted within the flange 68 the notches 72 engaging the lugs 70. This ring is also mounted for sliding movement but the notches 72 are never out of engagement with the lugs 70 so that the ring 71 will always rotate with the hub. The externally toothed ring gear 61 is then placed over the reduced end 77 and the ring 81 screwed into the bore 79, thus rotatably supporting the gear 61 on the extension 77 between the shoulder 78 and the flange 82. This assembled unit is then slipped over the collar 109 and the closure ring 66 screwed into the open end of the groove 47 thus retaining the parts so assembled in place. As will be seen in Figs. 1 and 8 to 10, due to the eccentricity of the bore 80 in the central member 74 the externally toothed ring gear 61 will always be in mesh with the internally toothed ring gear 56 at one point— that point being opposite the point of greatest eccentricity between the bore 81 and the periphery of the body part 75. Springs 112 tend to move the clutch rings 71 toward the gears 56 and 61.

The hub is then fastened to the drive shaft in any well known suitable manner, not shown, with the ring 91 in place within the bore 90 in the extension 85, and the ring 89 is clamped within the groove 88 with the pins 95 extending through the slots 96 and into the slots 97. Then the operating rods 98 and 103 and the bell crank 100 are connected in their proper places.

In operation, if it is desired to rotate the blades in one direction the various connected parts are moved to the position shown in Figs. 1, 2 and 8, 8a, by rotating the ring 89 in the proper direction, by the linkage 98 to 105 used for that purpose. This will bring the lugs 64 on the externally toothed ring gear 61 into engagement with the lugs 55 on the spiral gear 50 which forms a driving connection between the two gears. The springs 112 will move the clutch ring 71 contained within the flange 68 on the closure ring 66 against the lugs 60 on the gear 56, so that the lugs 73 on the clutch ring will engage the lugs 60 on the gear 56. Thus the gear 56 will be clutched to the hub, through lugs 60 and 73 and clutch ring 71, notches 72, lugs 70 and closure ring 66, and will be held from rotation with respect thereto. The control member 74 is held stationary by the frictional engagement with the ring 91 through the medium of the brake lining 92. As the hub rotates the internal gear 56 rotates with it. This will cause the ring gear 61 to rotate on the control member 74, and due to the fact that the gears mesh at only one point on account of the eccentricity of the control member and since this point is constantly changing as the hub rotates about the stationary control member the externally toothed ring gear 61 will be caused to roll about the interior of the internally toothed ring gear 56 which will give the gear 61 a slow rotation with respect to the hub. Consequently since the gear 61 is clutched to the spiral gear 50, the spiral gear 50 will rotate with it and it in turn, through the gear 32 and the various shaft gears and worm hereinbefore described, will rotate the blades 5.

When it is desired to rotate the blades in the opposite direction the ring 89 is rotated to move the parts to the position shown in Fig. 9. In this position the spiral gear 50 is clutched to the internally toothed ring gear 56 through the lugs 55, notches 72, clutch ring 71 and lugs 73 on the clutch ring and lugs 59 on the internal gear; and the externally toothed ring gear 61 is locked to the hub through the lugs 65 and 70 and closure ring 66. Then as the hub rotates the internally toothed ring gear 56 will be caused to roll about the externally toothed ring gear 61 since the ring gear 61 is clutched to the hub. This rolling of the internally toothed ring gear will give it a slow rotation with respect to the hub, which in turn will give the spiral gear 50 an opposite rotation to that given it by the ring gear 61. The spiral gear and connected parts will then rotate the blades in the opposite direction.

After the blades have been rotated in either direction to the desired position the ring 83 is rotated to move the parts to a neutral position as shown in Fig. 10. In this position the parts will all remain stationary with respect to the hub and will rotate with it.

In order to prevent the blades from being accidentally operated too far an automatic stop mechanism is provided which will stop the rotation of the blades when they reach a predetermined point in either direction. This mechanism will now be described.

As previously described, when the gear 32 is rotated in one direction it is clutched to the shaft 28 by the clutch member 35 and when it is rotated in the opposite direction it is clutched to the shaft 28 by the other clutch member 36 (Figs. 5, 6 and 7).

The clutch member 35 comprises a cylindrical body portion 115 having the clutch face 37 at one end and an annular flange 116 at the other end and is slidably keyed on the shaft 28 by a key 117. An exteriorly threaded ring 118 is slidably keyed at 119 on the exterior of the body part 115.

The other clutch member 36 is similar to the clutch member 35 and comprises a cylindrical body member 120 having the clutch face 38 on one end and an annular flange 121 on the other end, and is slidably keyed to the shaft 28 by a key 122. An exteriorly threaded ring 123, similar to the ring 118, is slidably keyed at 124 on the exterior of the body part 120.

The bearing members 28ª and 28ᵇ have cylindrical extensions 125 and 126 respectively which are bored and threaded as indicated at 127 and 128.

When assembled the ring 118 is screwed into the threaded bore 127 in the bearing member 28ª and the ring 123 is screwed into the threaded bore 128 in the bearing member 28ᵇ.

When the gear 32 is rotated in a direction to positively engage the clutch member 35 the ring 118 will be moved away from the gear 32 and the ring 123 will be moved toward the gear 32. When the gear 32 has made a predetermined number of revolutions the ring 118 will engage the flange 116 on the clutch member 35 and will move the clutch face 37 out of engagement with the clutch face 33, which will permit the gear 32 to rotate without rotating the shaft 28 and the various parts connected thereto. After the clutch faces 33 and 37 have been disengaged the clutch faces 34 and 38 will merely slide over each other, the clutch member 36 being moved back and forth on the shaft 28 against the pressure of the spring 40.

In a like manner when the gear 32 is rotated in the opposite direction it will positively engage the clutch member 36 through the clutch faces 34 and 38. This will move the ring 123 away from the gear 32 and the ring 118 toward the gear 32, and after a predetermined number of revolutions of the gear 32 the ring 123 will engage the flange 121 and disengage the clutch member 36 from the gear 32, thus permitting the gear 32 to rotate without rotating the shaft 28. The limits to which the blades 5 may be rotated depend on the initial setting of the rings 118 and 123 when the parts are assembled. These limits will vary for different designs of propellers, motors and aeroplanes and for the particular type of services for which the aeroplane is used. In order to change these limits it is necessary to disassemble all the parts in the bore 29 and re-set the rings 118 and 123.

This mechanism provides a simple, efficient and fool proof means for positively limiting the pitch variations of the blades.

From the foregoing it will be seen that I have provided a simple and efficient mechanism, contained wholly within the propeller hub, for varying the pitch of the propeller blades while they are in operation, and have designed and arranged the various parts in such a manner that they are in operation only during that very short time required to change the pitch of the blades. The parts are also so designed and arranged that they are never subjected to any severe shocks or strains, which, together with the fact that they are in operation for very short periods only, will cause them to last indefinitely without appreciable wear.

It is to be understood that various changes can be made in the construction and arrangement of the different parts without departing from the spirit of my invention and that the invention is limited only by the scope of the appended claims.

Having thus described my invention, what I claim is:

1. In a variable pitch propeller, the combination of a rotatable hub, propeller blades carried by said hub, means for changing the pitch of said blades including a pair of gears one of which is an externally toothed gear, means for holding one of said gears against rotation with respect to said hub, and means, including an eccentric, for causing rotation of the other gear with respect to said hub, said externally toothed gear being rotatably mounted on said eccentric.

2. In a variable pitch propeller, the combination of a rotatable hub, propeller blades carried by said hub, means for changing the pitch of said blades including a pair of gears one of which is an externally toothed gear, means for holding one of said gears against rotation with respect to said hub, means, including an eccentric, for causing rotation of the other gear with respect to said hub, said externally toothed gear being rotatably mounted on said eccentric, and means for holding said eccentric against rotation or enabling the eccentric to rotate with said hub.

3. In a variable pitch propeller, the combination of a rotatable hub, propeller blades carried by said hub, means for changing the pitch of said blades including a pair of gears, means for holding one of said gears against rotation with respect to said hub while permitting rotation thereof with respect to the other gear, one of said gears being an internally toothed gear and the other being an externally toothed gear disposed within and meshing with said internal gear, and means for shifting said internal gear axially of the external gear.

4. In a variable pitch propeller, the combination of a drive shaft, a hub non-rotatably mounted on said drive shaft, propeller blades carried by said hub, each of said propeller blades having a worm gear connected thereto, a worm operatively connected with said worm gears, means for driving said worm in either direction including an internal gear and an external gear meshing therewith, and means for causing a relative axial movement between said internal and external gears.

5. In a variable pitch propeller, the combination of a rotatable hub, propeller blades carried by and rotatable with respect to said hub, and means for changing the pitch of said blades including a pair of ring gears meshing with each other, and means for preventing a relative rotary movement between one of said gears and said hub and for causing a relative rotary movement between said other gear and said hub.

6. In a variable pitch propeller, the combination of a rotatable hub, propeller blades carried by and rotatable with respect to said hub, and means for changing the pitch of said blades including a pair of ring gears meshing with each other, and means for selectively connecting one of said gears to the hub and for effecting a driving connection between the other of said gears and the blades.

7. In a variable pitch propeller, the combination of a rotatable hub, propeller blades carried by said hub, means for changing the pitch of said blades including a pair of ring gears constantly meshing with each other, and means for selectively effecting a driving connection between either of said ring gears and said blades and between the other of said gears and said hub.

8. In a variable pitch propeller, the combination of a rotatable hub, propeller blades carried by said hub, means for changing the pitch of said blades including a pair of ring gears constantly meshing with each other, means for preventing a relative rotary movement between one of said gears and said hub, and an eccentric for causing a relative rotary movement between the other of said gears and said hub.

9. In a variable pitch propeller, the combination of a rotatable hub, propeller blades carried by said hub, means for changing the pitch of said blades including a pair of ring gears constantly meshing with each other, and means for preventing a relative rotary movement between one of said gears and said hub, and means including an eccentric for causing a relative rotary movement between the other of said gears and said hub, and means for forming a driving connection between the last mentioned gear and said blades.

10. In a variable pitch propeller, the combination of a rotatable hub, propeller blades carried by said hub, means for changing the pitch of said blades including an internally toothed ring gear and an externally toothed ring gear meshing with each other, and means for forming a driving connection between either of said gears and said blades.

11. In a variable pitch propeller, the combination of a rotatable hub, propeller blades carried by said hub, means for changing the pitch of said blades including an internally toothed ring gear and an externally toothed ring gear meshing with each other, the externally toothed gear having slightly fewer teeth than the internally toothed gear.

12. In a variable pitch propeller, the combination of a rotatable hub, propeller blades carried by said hub, means for changing the pitch of said blades including an internally toothed ring gear and an externally toothed ring gear meshing with each other, the externally toothed ring gear having fewer teeth than the internally toothed gear, and means for forming a driving connection between either of said gears and said blades.

13. In a variable pitch propeller, the combination of a rotatable hub, propeller blades carried by said hub, means for changing the pitch of said blades including a pair of ring gears meshing with each other, and means including an eccentric for preventing a relative rotary movement between one of said gears and said hub and causing a relative rotary movement between said other gear and said hub.

14. In a variable pitch propeller, the combination of a drive shaft, a rotatable hub secured to said drive shaft, propeller blades carried by said hub, means for changing the pitch of said blades, including a pair of ring gears meshing with each other, both of said gears surrounding the drive shaft, and means for selectively effecting a driving connection between either of said gears and said hub.

15. In a variable pitch propeller, the combination of a drive shaft, a rotatable hub secured to said drive shaft, propeller blades carried by said hub, means for changing the pitch of said blades, including a pair of ring gears meshing with each other, both of said gears surrounding the drive shaft, and means for selectively effecting a driving connection between either of said gears and said blades.

16. In a variable pitch propeller, the combination of a drive shaft, a hub rigidly secured to said drive shaft, angularly adjustable blades secured in said hub, means for adjusting said blades while the propeller is in motion, said means comprising two gears one surrounding the other and both surrounding said shaft and meshing with each other and normally rotating with said shaft, said gears being rotatable relative to each other and relative to said shaft, means for causing said rotary movement of either of said gears at will and gear mechanism operated by the rotation of either of said gears for adjusting said blades.

17. In a variable pitch propeller, the combination of a drive shaft, a hub secured to said drive shaft, propeller blades carried by said hub, means for changing the pitch of said blades including a pair of ring gears meshing with each other, means for selectively effecting a driving connection between one of said gears and said hub and a driving connection between the other of said gears and said blades.

18. In a variable pitch propeller, the combination of a drive shaft, a hub secured to said drive shaft, propeller blades carried by said hub, means for changing the pitch of said blades including a pair of ring gears meshing with each other, and means for simultaneously connecting one of said gears to said hub and the other of said gears to said blades.

19. In a variable pitch propeller, the combination of a drive shaft, a hub secured to said drive shaft, propeller blades carried by said hub, means for changing the pitch of said blades including a pair of ring gears meshing with each other, and means for simultaneously connecting one of said gears to said hub and the other of said gears to said blades, said last mentioned means including a sleeve surrounding said drive shaft and slidable along said shaft.

20. In a variable pitch propeller, the combination of a drive shaft, a hub secured to said drive shaft, propeller blades carried by said hub, means for changing the pitch of said blades including a pair of ring gears meshing with each other, an eccentric sleeve surrounding said drive shaft, one of said gears being rotatably secured within the hub, the other of said gears being rotatably mounted on said eccentric sleeve, means for shifting said sleeve axially of said shaft and means operated by the shifting of said sleeve for connecting one of said gears to said hub and the other of said gears to said blades.

21. In a variable pitch propeller, the combination of a drive shaft, a hub secured to said drive shaft, propeller blades carried by said hub, means for changing the pitch of said blades including a pair of ring gears meshing with each other, an eccentric sleeve surrounding said drive shaft, one of said gears being rotatably secured within the hub, the other of said gears being rotatably mounted on said eccentric sleeve, means for shifting said sleeve axially of said shaft, and means operable by the shifting of said sleeve for connecting one of said gears to said hub and the other of said gears to said blades, said last mentioned means including a pair of clutches, one positioned on one side of said gears and the other positioned on the other side of said gears.

22. In a variable pitch propeller, the combination of a rotatable hub, propeller blades carried by said hub, means for changing the pitch of said blades including a pair of ring gears meshing with each other, means for selectively connecting either of said gears to the hub, means for effecting a driving connection between the other of said gears and the blades, and automatic means for rendering said driving connection inoperative when the pitch of the blades reaches a predetermined limit in either direction.

23. In a variable pitch propeller, the combination of a drive shaft, an eccentric sleeve surrounding said drive shaft and normally rotating therewith, a hub secured to said drive shaft, propeller blades carried by said hub, means for changing the pitch of said blades, said means including a pair of gears meshing with each other, means for retarding the rotation of said sleeve with respect to the drive shaft thereby causing a relative rotation of said gears with respect to each other, and means for effecting a driving connection between either of said gears and said blades.

24. In a variable pitch propeller, the combination of a drive shaft, a hub secured to said drive shaft, propeller blades carried by said hub, a speed reducing mechanism carried by said hub and operated by the rotation of said hub for changing the pitch of said blades, said mechanism including an internally toothed gear and an externally toothed gear meshing therewith, means for selectively causing one of said gears to roll around the other, and means for forming a driving connection between either of said gears and said blades.

25. In a variable pitch propeller, the combination of a drive shaft, a hub secured to said drive shaft, propeller blades carried by said hub and rotatable therewith, and means for changing the pitch of said blades including a pair of gears constantly meshing with each other, and means for selectively effecting a driving connection between one of said gears and said hub and a driving connection between the other of said gears and said blades.

26. In a variable pitch propeller, the combination of a drive shaft, a hub secured to said drive shaft, propeller blades carried by said hub, means for changing the pitch of said blades including a pair of gears constantly meshing with each other, and means for simultaneously connecting one of said gears with said hub and the other of said gears with said blades.

27. In a variable pitch propeller, the combination of a drive shaft, a hub secured to the drive shaft, propeller blades rotatably secured in said hub, mechanism for rotating the said propeller blades, and means for controlling the operation of said blade rotating mechanism including an eccentric sleeve surrounding the drive shaft and normally rotating therewith and means for retarding the rotation of said sleeve with respect to the drive shaft.

28. In a variable pitch propeller, the combination of a drive shaft, a hub secured to the drive shaft, propeller blades rotatably secured in said hub, mechanism for rotating the said propeller blades, and means for controlling the operation of said blade rotating mechanism including an eccentric sleeve surrounding the drive shaft and normally rotating therewith and means for retarding the rotation of said sleeve with respect to the drive shaft, and means for shifting said sleeve longitudinally of said drive shaft and for retarding the rotation thereof with respect to said drive shaft.

29. In a variable pitch propeller, the combination of a drive shaft, a rotatable hub secured to said drive shaft, propeller blades carried by said hub, means for changing the pitch of said blades, including a pair of gears surrounding said drive shaft, one of said gears being mounted concentric to said drive shaft and the other gear being mounted eccentric to said drive shaft, and means for effecting a driving connection between either of said gears and said propeller blades.

30. In a variable pitch propeller, the combination of a drive shaft, a hub secured to said drive shaft, propeller blades carried by said hub, means for changing the pitch of said blades in either direction including a pair of gears surrounding said drive shaft and constantly meshing with each other, means for simultaneously connecting one of said gears with said hub and the other of said gears with said blades.

31. In a variable pitch propeller, the combination of a drive shaft, a hub secured to said drive shaft, propeller blades carried by said hub, means for changing the pitch of said blades in either direction including a pair of gears surrounding said drive shaft and constantly meshing with each other, and means for simultaneously connecting one of said gears with said hub and the other of said gears with said blades, said last mentioned means including a single brake for shifting one of said gears with respect to the other.

32. In a variable pitch propeller, the combination of a drive shaft, a hub secured to said drive shaft, propeller blades carried by said hub, means for changing the pitch of said blades including a pair of gears constantly meshing with each other and disposed one within the other, means for simultaneously and selectively connecting one of said gears with said hub and the other of said gears with said blades to change the pitch of said blades in either direction, said last mentioned means including a brake and means for moving one of said gears axially with respect to the other gear.

HOWARD C. MEON.